United States Patent [19]

Stock

[11] Patent Number: 5,060,592
[45] Date of Patent: Oct. 29, 1991

[54] STEERING DIRECTION INDICATOR FOR BOATS

[76] Inventor: Marvin G. Stock, 7460 Pickway Dr., Cincinnati, Ohio 45233

[21] Appl. No.: 601,295

[22] Filed: Oct. 22, 1990

[51] Int. Cl.⁵ .............................................. G01P 13/02
[52] U.S. Cl. ..................................... 116/215; 116/31; 33/1 N
[58] Field of Search ........... 116/31, 26, 215, DIG. 20, 116/DIG. 21, 19; 33/365, 1 N, 335, 347, 354

[56] References Cited

U.S. PATENT DOCUMENTS 3,415,217 12/1968 McGrath ............................ 116/215
3,569,932 3/1971 Reed .................................... 116/31
4,157,076 6/1979 Roth et al. ........................ 116/31 X Primary Examiner—Harry N. Haroian
Attorney, Agent, or Firm—Wood, Herron & Evans

[57] ABSTRACT

A rudder position indicator attachable to the steering wheel of a boat for rotation with the wheel, in which a ball, held in a substantially constant position by gravity, rolls in a spiral groove as the wheel and the indicator are turned. The ball is seen against indicia in the groove, the indicia locations being indicative of the position of the steering wheel.

2 Claims, 1 Drawing Sheet

STEERING DIRECTION INDICATOR FOR BOATS

SUMMARY OF THE INVENTION

This invention relates to a steering direction indicator for boats, useful in both sailing and motorboats. Such boats customarily have a steering wheel (helm) rotatable about a generally horizontal axis. It is sometimes difficult for the operator of a boat to know the position of the rudder. It is often especially important to know this information when docking or leaving the dock, pulling up a water-skier, etc., at which time there may be little margin for error in conning the boat.

An objective of the invention has been to provide a steering indicator that is attachable to the center of the steering wheel at the axis of rotation, to tell the operator at a glance the position of the rudder, that is, whether generally straight ahead, turned to port, or turned to starboard and the amount that it is turned.

This objective of the invention has been attained by providing an indicator that has a spiral groove which contains a freely rolling ball, the central origin of the spiral being positioned proximate the axis of rotation of the steering wheel. The indicator is sealed and has a transparent cover through which the operator can see the position of the ball relative to the groove. Indicia are provided on the bottom of the groove and against which indicia the ball is seen, to provide at a glance indication of the position of the rudder. The indicia are, for example, white color for generally straight-ahead steering, red color for steering to port, and green for steering to starboard. The indicator may be attached to the wheel by an adhesive, or by a screw, for which a central hole is provided in the indicator.

The indicator is attached to the wheel with the rolling ball in the center of the straight-ahead rudder position and the helm set for straight-ahead direction. The ball, which is of metal or other weighty material, is held by gravity in substantially this same position, so that as the wheel is turned to port, for example, from the straight-ahead position, counterclockwise turning of the indicator with the wheel moves a portion of the port direction indicia in the groove to a position behind the ball, giving visible indication of this direction of steering. Likewise, when the wheel is turned from the straight-ahead position to a turn to starboard position, the ball will be seen against the starboard direction indicia. When the wheel is turned from either side direction back to the straight-ahead position, the ball will again be seen against the straight-ahead indicia.

Further, the distance that the ball in the spiral groove has traveled away from the straight position can be seen, thereby indicating to the helmsman roughly the degree to which the rudder has turned forward port or starboard.

The objects of the invention are well satisfied by the provision of a indicator that is easy to attach, simple and inexpensive in construction, is well adapted to mass production, and provides immediate and unmistakeable indication of the direction of steering according to the position of the steering wheel.

DETAILED DESCRIPTION OF A PREFERRED EMBODIMENT

Figure 1:
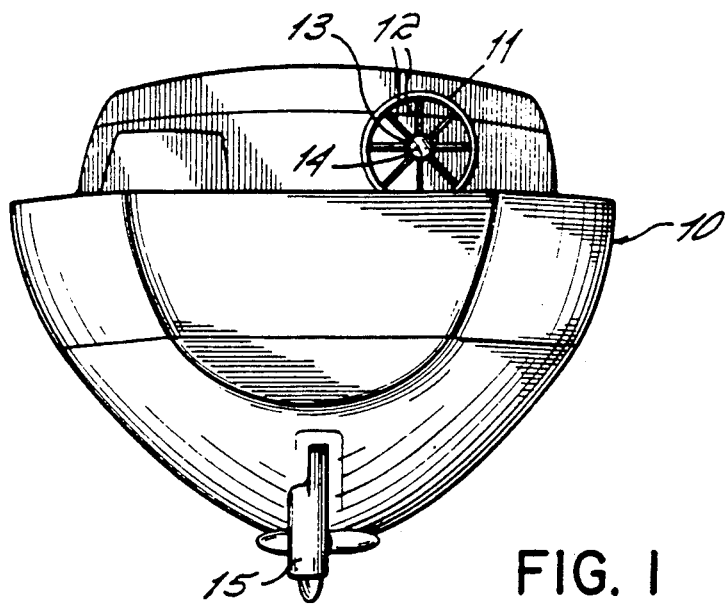
FIG. 1 is a perspective view of a portion of the stern of a sailing boat, showing the steering wheel or helm, and an indicator according to the invention attached to the center of the wheel.
Figure 2:
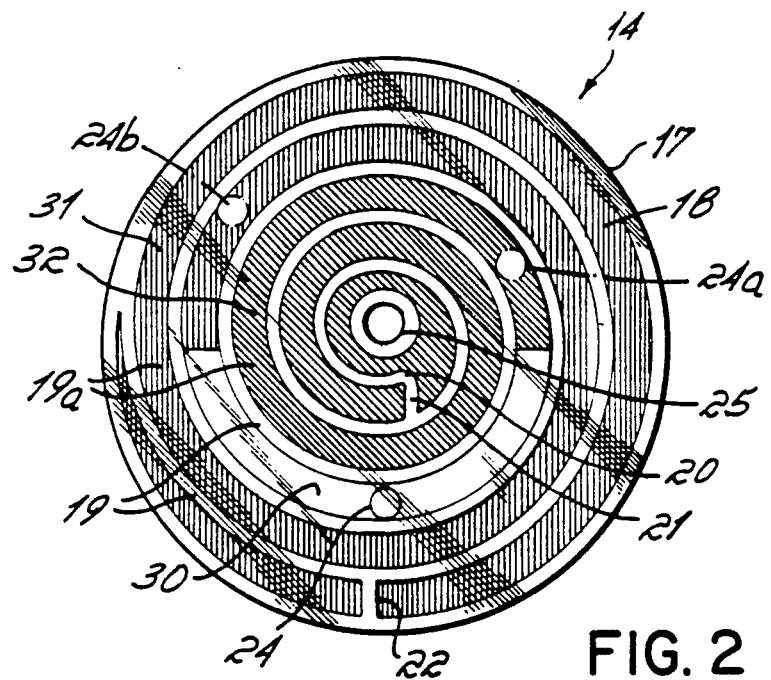
FIG. 2 is a plan view of a preferred form of the indicator according to the invention.
Figure 3:
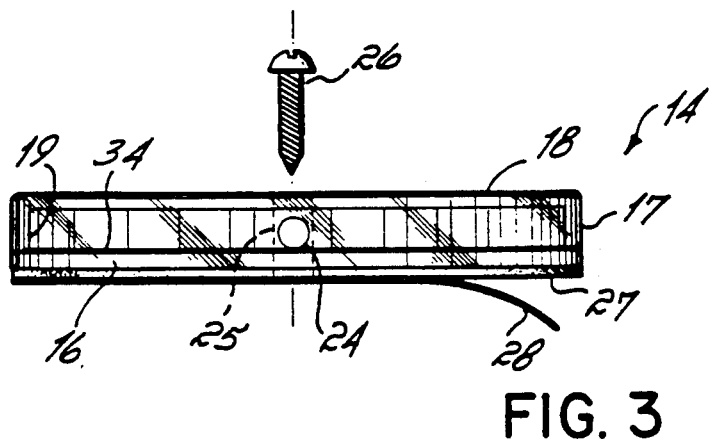
FIG. 3 is a side elevational view of the indicator shown in FIG. 2, a peel-off cover for adhesive being shown partly removed from the back of the indicator.

FIG. 1 shows a portion of the stern of a boat 10 having a steering wheel or helm 11 attached by spokes 12 to a central hub 13 to which is attached a steering indicator 14, better shown in FIGS. 2 and 3. It will be noted that, as in most boats, the helm 11 rotates about a generally horizontal axis. The wheel is connected to a rudder 15 to pivot the rudder to the left or right when the wheel is turned counter-clockwise or clockwise, respectively.

Referring now to FIG. 2, the indicator is seen as it would be viewed by a person steering the boat 10. In FIGS. 2 and 3, a bottom wall 16 of generally circular shape, a continuous peripheral side wall 17, and a transparent circular cover 18 form an enclosure. Within the enclosure is a spiral wall 19 extending from the upper surface of bottom 16 to the lower surface of cover 18. The origin 20 of the spiral wall is proximate the center of the enclosure. Wall 19 defines a spiral groove 19a whose origin is proximate the center of the enclosure and is defined by an end portion 21 of wall 19. The other end of the groove is proximate side wall 17, and is defined by a wall portion 22. A ball 24 rolls freely in the groove 19a.

A hole 25 extends through the center of the indicator to provide one means of attachment to the steering wheel by penetrating means such as screw 26. Another means of attachment is by means of a layer of pressure sensitive adhesive on the back of bottom wall 16, as indicated at 27, covered prior to attachment by a peel-off sheet 28, shown partly peeled off in FIG. 3.

Indicia are provided in groove 19a on the upper surface of bottom 16. The indicia are of three different types. Indicia 30, corresponding to generally straight-ahead position of the rudder 15, is preferably white. Indicia 31, indicating that the rudder is turned to port, is preferably red. Indicia 32, indicating that the rudder is turned to starboard, is preferably green. These color selections correspond to the boat lights: green to starboard and red to port. Of course other indicia may be selected if preferred. As shown in FIG. 2, indicia 30 for straight-ahead is located in an intermediate portion or stretch of groove 19a, with its ends approximately 180 degrees apart, the other two indicia portions each beginning at the respective ends of indicia 30. Thus, if the rudder is turned substantially to port from the straight-ahead position, the red indicia will appear behind ball 24, while such turn of the wheel to the right will bring the green indicia behind the ball. In each case the relative positions of the indicia and the ball indicate the position of the steering wheel.

In the preferred form of the invention, the groove 19a has about two convolutions overlying the red area and about two convolutions overlying the green area. Thus there is a lengthy path over which the ball 24 may travel in either the red or green portion of the groove. The helmsman will quickly get used to noting the distance the ball has traveled in its path and thus visualize not only the direction of the rudder but also the amount that the rudder 15 has been turned in that direction.

The indicia can be applied by any suitable method, preferably by attaching to bottom 16 a disc of paper bearing 34 the indicia properly arranged as shown in FIG. 3.

The indicator walls, bottom and cover are molded of a suitable hard, water resistant plastic, bottom 16 being molded or cut out as a separate disc, while cover 18, side wall 17, and spiral wall 19 are molded as one piece. After the indicia are adhered to bottom 16, the upper unit, comprising cover 18, side wall 17 and spiral wall 19, is attached to the bottom by solvent or other means for joining the side wall 17 to the edge of bottom 16.

To install the indicator, the installer must first make sure that the rudder is in the straight-ahead position. The indicator is then attached to the hub of the steering wheel by adhesive after stripping off sheet 27, or by screw 26 through hole 25. It may be necessary first to remove any dome-shaped cover for the hub, these being usually attached by screws.

With the rudder at the straight-ahead position, the indicator must be attached with ball 24 in the center of the straight-ahead indicia, as shown in FIG. 2. With the indicator so attached, turning of the helm in the starboard turn direction will rotate the indicator with the helm, such rotation moving the indicator so that ball 24 is seen against the starboard turn indicia (the dotted ball position 24a). If the helm is in a port turn direction, the ball will be seen against the port turn indicia as at 24b. It will be understood that gravity causes ball 24 to remain substantially stationary, except for movement caused by motion, such as rolling, of the boat. Accordingly, in the dotted positions 24a and 24b, the ball would still be below the axis of rotation of the helm and the indicator.

The invention has been described with reference to a preferred embodiment. However, it will be appreciated that variations and modifications can be effected within the ordinary skill of the art without departing from the scope of the invention as defined by the appended claims.

What is claimed is:

1. A rudder position indicator for a boat having a steering wheel connected to a rudder, the axis of rotation of said wheel being generally horizontal, comprising:

wall means forming a single spiral groove about a central location, said groove beginning at first stop means located proximate said central location and ending at second stop means, means for attaching said indicator to the center of said steering wheel with said central location proximate said axis of rotation, and rolling means in said groove and visible to the boat operator, said rolling means being movable in said groove as said steering wheel is rotated, between: (a) said first stop means when said wheel and rudder are at an extreme degree of wheel rotation and rudder movement in one direction, (b) said second stop means when said wheel and rudder are at an extreme degree of wheel rotation and rudder movement in the opposite direction, and (c) a central position approximately midway between said two stop means when said wheel and rudder are at a straight-ahead position, said groove having indicia cooperating with said rolling means and visible to the operator, said indicia comprising: (a) a first portion colored white located in an intermediate portion of said groove, with its ends approximately 180° apart and horizontally aligned, indicating, with said rolling means, a generally straight-ahead position of said wheel and rudder, (b) a second portion colored red beginning at one end of said first portion, indicating, with said rolling means, steering to port, and (c) a third portion colored green beginning at the other end of said first portion, indicating, with said rolling means, steering to starboard.

2. A rudder position indicator for a boat having a steering wheel connected to a rudder, the axis of rotation of said wheel being generally horizontal, comprising:

wall means forming a single spiral groove about a central location, said groove beginning at first stop means located proximate said central location and ending at second stop means, means for attaching said indicator to the center of said steering wheel with said central location proximate said axis of rotation, and rolling means in said groove and visible to the boat operator, said rolling means being movable in said groove as said steering wheel is rotated, between: (a) said first stop means when said wheel and rudder are at an extreme degree of wheel rotation and rudder movement in one direction, (b) said second stop means when said wheel and rudder are at an extreme degree of wheel rotation and rudder movement in the opposite direction, and (c) a central position approximately midway between said two stop means when said wheel and rudder are at a straight-ahead position, said groove having indicia cooperating with said rolling means and visible to the operator, said indicia comprising: (a) a first portion colored a first color located in an intermedicate portion of said groove, with its ends approximately 180° apart and horizontally aligned, indicating, with said rolling means, a generally straight-ahead position of said wheel and rudder, (b) a second portion colored a second color beginning at one end of said first portion, indicating, with said rolling means, steering to port, and (c) a third portion colored a third color beginning at the other end of said first portion, indicating, with said rolling means, steering to starboard.

* * * * *